US012771467B2

(12) United States Patent
Rock et al.

(10) Patent No.: US 12,771,467 B2
(45) Date of Patent: Oct. 20, 2026

(54) PRECISION TIMING ACROSS OCP NICS

(71) Applicant: Dell Products, L.P., Round Rock, TX (US)

(72) Inventors: Jason Christopher Rock, Austin, TX (US); Jonathan Foster Lewis, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 296 days.

(21) Appl. No.: 18/672,660

(22) Filed: May 23, 2024

(65) Prior Publication Data

US 2025/0365087 A1 Nov. 27, 2025

(51) Int. Cl.
*H04J 3/06* (2006.01)

(52) U.S. Cl.
CPC .................................. *H04J 3/0697* (2013.01)

(58) Field of Classification Search
CPC ..................... H01R 31/06; H05K 1/18; H05K 2201/10189; H05K 2201/10356; H05K 2201/10522; H04J 3/0697
See application file for complete search history.

(56) References Cited

U.S. PATENT DOCUMENTS

| | | | | |
|---|---|---|---|---|
| 9,998,247 | B1 * | 6/2018 | Choudhury | H04J 3/0667 |
| 10,164,759 | B1 * | 12/2018 | Volpe | H04J 3/0688 |
| 2020/0026683 | A1 * | 1/2020 | Olarig | G06F 3/0604 |
| 2024/0364062 | A1 * | 10/2024 | Nien | H05K 1/18 |

FOREIGN PATENT DOCUMENTS

| | | | |
|---|---|---|---|
| WO | WO-2017044301 A1 * | 3/2017 | G06F 15/17 |

* cited by examiner

*Primary Examiner* — Sun Jong Kim
(74) *Attorney, Agent, or Firm* — Amin, Turocy & Watson, LLP

(57) ABSTRACT

Architectures and techniques are described that can facilitate precision timing synchronization with a network interface card (NIC) that is compliant with an open compute project (OCP) NIC specification. In that regard, certain pins that are specified to provide reduced media-independent interface (RMII)-based transport (RBT) can be repurposed. Thereafter the particular RBT pins that are repurposed for precision timing synchronization functions can be utilized to provide precision timing synchronization functions, RBT functions, or both.

20 Claims, 11 Drawing Sheets

300A

| OCP NIC 3.0 PINS (304) | FLEXIO (306) | RBT (308) | TIMING SYNC (310) |
|---|---|---|---|
| OCP_A3 | FLEXIO0 | RBT_TXEN | TS_GPIO |
| OCP_A8 | FLEXIO1 | RBT_TXD1 | TSTX_FREQ_N |
| OCP_A9 | FLEXIO2 | RBT_TXD0 | TSTX_FREQ_P |
| OCP_A14 | FLEXIO3 | RBT_CLK_IN | TSTX_SYNC |
| OCP_B8 | FLEXIO4 | RBT_RXD1 | TSRX_FREQ_N |
| OCP_B9 | FLEXIO5 | RBT_RXD0 | TSRX_FREQ_P |
| OCP_B14 | FLEXIO6 | RBT_CRSDV | TSRX_SYNC |

FIG. 3A

300B

250 RBT_ISOLATE# SIGNAL →

| FLEXIO_SEL [1:0] (320) | MODE (322) |
|---|---|
| 00 | FULL ISOLATION |
| 01 | RBT BUS ACTIVE |
| 10 | TIMING SYNC ACTIVE |
| 11 | RESERVED |

FIG. 3B

400

| OFFSET 402 | LENGTH 404 | DECRIPTION 406 |
|---|---|---|
| 0 | 1 | INGRESS FREQUENCY MODE **408**<br><br>0x00: 10 MHz SINGLE-ENDED CLOCK<br>0x01: 8 kHz SINGLE-ENDED CLOCK<br>0x02: ePPS SINGLE-ENDED CLOCK<br>0x03-0x0E: RESERVED<br>0x0f: OEM CUSTOM SINGLE-ENDED CLOCK<br><br>0x10: 10 MHz DIFFERENTIAL CLOCK<br>0x11: 156.25 MHz DIFFERENTIAL CLOCK<br>0x12-0xFC: RESERVED<br><br>0xFD: OEM CUSTOM DIFFERENTIAL CLOCK<br>0xFE: NOT SUPPORTED<br>0xFF: UNKNOWN |
| 1 | 1 | INGRESS SYNC PULSE MODE **410**<br><br>0x00: 1 PULSE PER SECOND<br>0xFE: NOT SUPPORTED<br>0xFF: UNKNOWN |
| 2 | 1 | EGRESS FREQUENCY MODE **412**<br><br>0x00: 10 MHz SINGLE-ENDED CLOCK<br>0x01: 8 kHz SINGLE-ENDED CLOCK<br>0x02: ePPS SINGLE-ENDED CLOCK<br>0x03-0x0E: RESERVED<br>0x0f: OEM CUSTOM SINGLE-ENDED CLOCK<br><br>0x10: 10 MHz DIFFERENTIAL CLOCK<br>0x11: 156.25 MHz DIFFERENTIAL CLOCK<br>0x12-0xFC: RESERVED<br><br>0xFD: OEM CUSTOM DIFFERENTIAL CLOCK<br>0xFE: NOT SUPPORTED<br>0xFF: UNKNOWN |

•
•
•

FIG. 4

500

| OFFSET 402 | LENGTH 404 | DECRIPTION 406 |
| --- | --- | --- |
| ⋮ | ⋮ | ⋮ |
| 3 | 1 | EGRESS SYNC PULSE MODE <u>**502**</u><br><br>0x00: 1 PULSE PER SECOND<br>0xFE: NOT SUPPORTED<br>0xFF: UNKNOWN |
| 4 | 2 | TIMING SYNCHRONIZATION GPIO MODE <u>**504**</u><br><br>NIC OUTPUT MODES:<br>BIT 0: NETWORK LOSS-OFSIGNAL<br>BIT 1: PRIMARY/SECONDARY LINK INDICATION<br>BIT 2: ALARM<br>BIT 3: OEM CUSTOM OUTPUT<br>BITS [7:4}: RESERVED FOR FUTURE USE<br><br>NIC INPUT MODES:<br>BIT 8: SYSTEM CLOCK LOSS-OF-SIGNAL<br>BIT 9: CLOCK SQUELCH<br>BIT 10: OEM CUSTOM INPUT<br>BITS [14:11]: RESERVED FOR FUTURE USE<br><br>BIT 15: NOT SUPPORTED<br>0xFF: UNKNOWN |

FIG. 5

PRECISION TIMING ACROSS OCP NICS

BACKGROUND

In networks today, and particularly telecommunication networks, precision timing refers to an accurate synchronization of clocks and timestamps across distributed systems in order to ensure precise coordination and timing of events. Precision timing can be crucial for maintaining the reliability, efficiency, and performance of network operations, particularly in scenarios where timing accuracy is critical, such as voice and video communication, financial transactions, industrial automation, scientific research, and so on. Precision timing relies on all devices and systems within a network to synchronize their clocks to a common time reference, typically provided by an external time source such as a global navigation satellite system (GNSS) like GPS (Global Positioning System) or Galileo. Clock synchronization ensures that all network components operate with consistent timing accuracy, minimizing timing errors and discrepancies.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which:

FIG. 3A depicts a block diagram illustrating an example of specific RBT pins being repurposed according to a general flexIO allocation as well as a specific precision timing synchronization allocation in accordance with certain embodiments of this disclosure;

FIG. 3B depicts a block diagram illustrating an example of flexIO selection modes and leveraging an RBT_Isolate# signal in accordance with certain embodiments of this disclosure;

FIG. 4 depicts a block diagram illustrating an example diagram of a first portion of a specification for data associated with the record in accordance with certain embodiments of this disclosure;

FIG. 5 depicts a block diagram illustrating an example diagram of a second portion of a specification for data associated with the record in accordance with certain embodiments of this disclosure;

DETAILED DESCRIPTION

Overview

Figure 1:
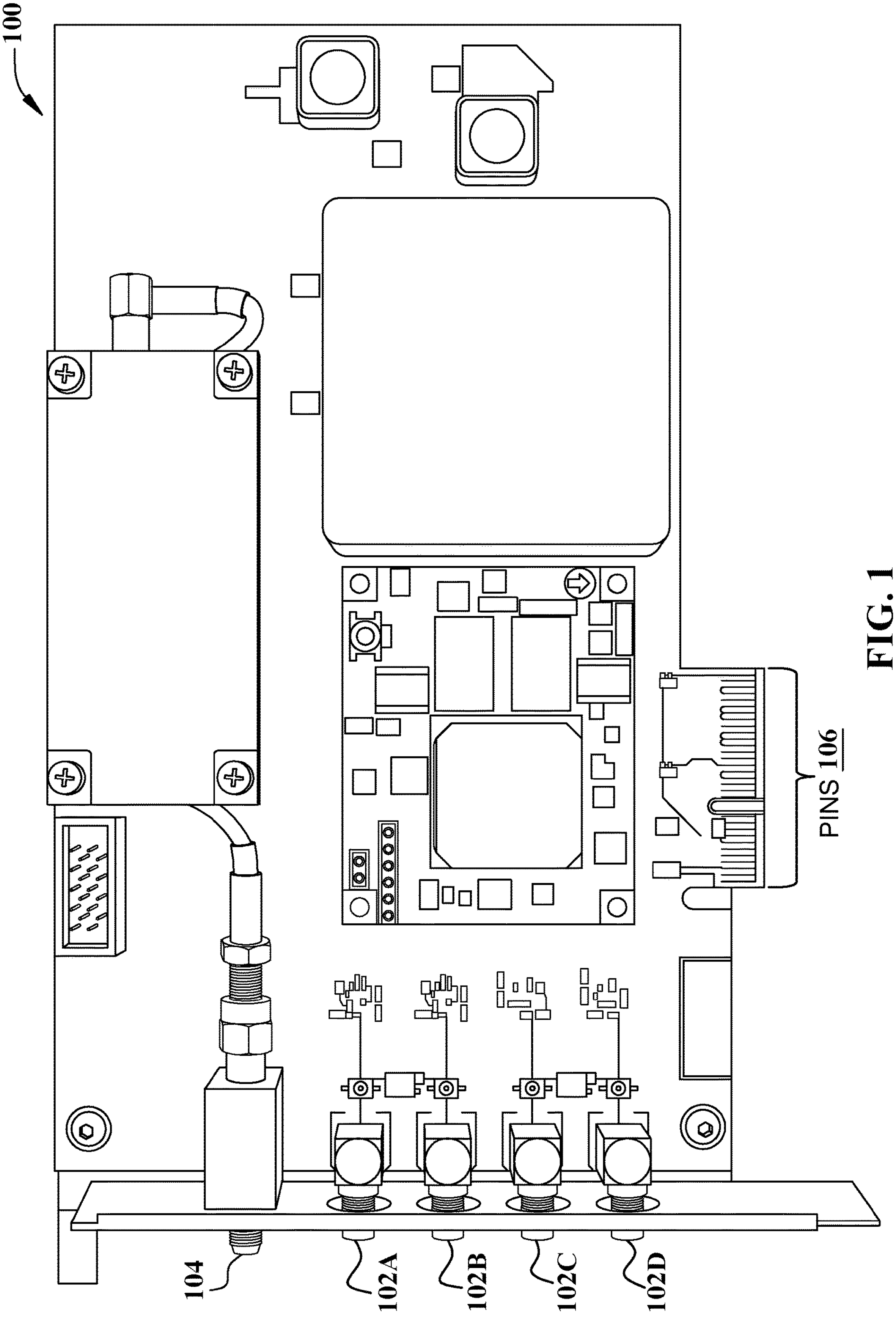
FIG. 1 shows a pictorial image illustrating an example network interface card (NIC) contributed to the open compute project (OCP) in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As noted in the background section, precision timing can be crucial for many applications. In the context of open standards networks (e.g., open radio access networks (O-RAN) or the like), and related commodity-based hardware that provide a significant advantage for open standards networks, many standards do not account for precision timing functionality. For example, network interface cards (NICs) that are compliant with open compute project (OCP) NIC 3.0 standard do not specify or account for precision timing functions.

Thus, applications that leverage precision timing are sometimes implemented with purpose-built hardware that is generally proprietary in nature, which is essentially antithetical to open standards networks. Alternatively, widely used NICs are generally designed to support precision timing via coaxial connectors. Thus, in order to support precision timing synchronization functionality, OCP NIC 3.0 cards are proposed to follow the same path, that is, to use coaxial cable connectors for precision timing synchronization.

To provide additional context, consider FIG. 1. FIG. 1 shows a pictorial image illustrating an example network interface card (NIC) 100 contributed to the open compute project (OCP) in accordance with certain embodiments of this disclosure. As can be observed, to supplement the network functionality with precision timing elements, existing OCP NICs 100 comprise one or more coaxial cable connectors 102. As indicated in this example, four different coaxial cable connectors 102 are provided, labeled here as coaxial cable connector 102A, coaxial cable connector 102B, coaxial cable connector 102C, and coaxial cable connector 102D. Coaxial cable connectors 102 are typically subminiature version A (SMA) type connectors.

Furthermore, OCP NICs 100 can comprise coaxial cable connector 104 that can be configured to couple to a global navigation satellite system (GNSS) antenna or the like, which can be a subminiature version B (SMB) type.

Propagating timing synchronization clocks within a common datacenter server presents challenges rarely observed in purpose-built telecommunication appliances. Timing synchronization clocks, normally frequency and a sync pulse, are commonly used in telecommunication applications such as 5G wireless and factory automation edge solutions to support high precision clock profiles such as G.8265.1, G.8275.1, and G.8275.2 as defined by the international telecommunications union (ITU) standardization body. These clocks synchronize both inter-system components as well as intra-system solutions. In the case of daisy chaining systems this may require up to four discrete clocks per NIC.

In the case of servers that have timing sync NICs included in their configuration, the NICs will utilize coaxial cables, custom cards, or both to support 5G and other timing sensitive applications. Today, NIC cards (e.g., OCP NIC 100), if supporting precision timing do so with coaxial cables that extend from the front of the bracket or internally, which presents internal cabling challenges for systems developers. For example, provisioning coaxial cables can be problematic for both factories as well as field services because coaxial cables can be difficult to mount (e.g., screw into connectors 102, 104), difficult to bend, particularly for internal arrangements, and lack a presence indication which can cause debug challenges if the clocks are not fully seated.

Unfortunately, many NIC hardware standard bodies neglect time synchronization. While OCP NIC 100 comprises may pins 106 for data transfer, none of those pins 106 are dedicated to propagating discrete timing synchronization clocks. This causes equipment hardware architects to consider either customizing the pinouts of common connector standards or defining their own custom mezzanine cards, such as networks line cards used by purpose-built telecommunications appliances.

A better solution can be to route timing signals through the NIC card connectors, via pins 106. However, the OCP standard generally specifies other uses for most of the pins 106, meaning there is little to no pin availability to provide at a minimum four independent single-ended clocks to replicate what is being propagated with 50-ohm coaxial cabling. Moreover, the pin count requirements increases if differential clocking or separate synchronous Ethernet clocks are also required to be propagated between a system's motherboard and NIC.

However, recently the OCP NIC 3.0 specification was updated to v1.3, which added to the specification the use of universal serial bus (USB) 2.0 pins that can be used for system management. Prior to v1.3, system management was handled specifically by pins devoted to reduced media-independent interface (RMII)-based transport (RBT) and/or via a system management (SM) bus. Given that the USB is nearly five times faster than RBT, the USB interface is favored, resulting in RBT pins becoming increasingly unused. While small form factor (SFF) has two unused pins (e.g., reserved for future use), such is not sufficient to support frequency and sync pulses in both direction, which typically requires four pins. Large form factor (LFF) has four pins available, but lacks a viable use case. The new dual small form factor (DSFF) specification has four pins, however, there are use cases where more pins may be needed.

Accordingly, the disclosed subject matter, in some embodiments, is directed to repurposing at least a portion of the pins allocated to RBT (e.g., from among pins 106) for precision timing synchronization. As certain RBT pins previously used for system management have very little use today following the introduction of USB pins. By using RBT pins to propagate precision timing across a NIC, the need for coaxial cables and associated connectors can be reduced or eliminated entirely. Such can be advantageous, as coaxial cables have been shown to be difficult to work with and are often highly disfavored by customers.

Certain techniques detailed herein can be codified into an OCP NIC standard (e.g., OCP NIC 3.0) and can be leveraged to expand the functionality of OCP NICs to provide for precision timing synchronization across the NIC connector (as opposed to via coaxial cables) as well as other potential functions in addition to or as an alternative to the precision timing synchronization that is detailed herein. Such can extend the life of the OCP NIC specification and can allow use cases not currently conceived to be achieved in a standardized way.

In that regard, this disclosure introduces the term “flexIO” in the context of a potential standardization technique and intended to represent a flexible input/output (flexIO). That is, RBT pins can be repurposed as flexIO pins in a standardized way. These flexIO pins can then be used in connection with precision timing synchronization, as detailed herein, or according to another function entirely.

Example Systems

Figure 2:
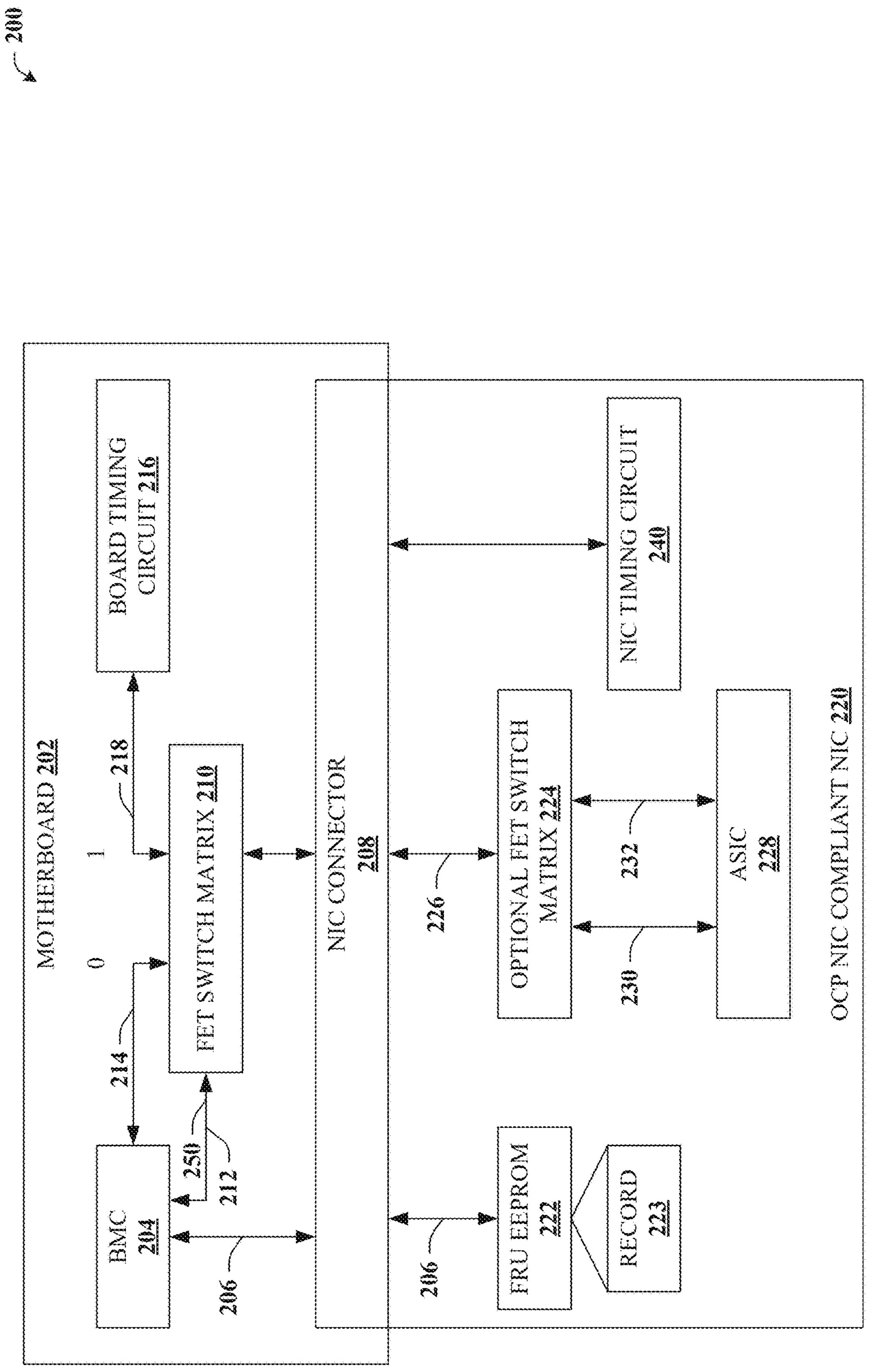
FIG. 2 depicts a schematic block diagram illustrating an example device that can repurpose certain RBT pins to propagate precision timing synchronization signals across a connector instead of via a coaxial cable in accordance with certain embodiments of this disclosure.

With reference now to FIG. 2, a schematic block diagram is depicted illustrating an example device 200 that can repurpose certain RBT pins to propagate precision timing synchronization signals across a connector instead of via a coaxial cable in accordance with certain embodiments of this disclosure. Precision timing synchronization can synchronize a board timing circuit 216 (which can be on motherboard 202) with a NIC timing circuit 240. In some embodiments, device 200 can be a server device such as a datacenter server or another suitable server that leverages precision timing synchronization.

Device 200 can comprise motherboard 202. Motherboard 202 can comprise baseboard management controller (BMC) 204. BMC 204 can be a specialized microcontroller or processor embedded on the motherboard of servers, high-end computers, and other devices. A primary function of BMC 204 can be to provide out-of-band remote management capabilities for the system, allowing administrators to monitor and manage servers remotely, regardless of the server's operating system or whether the server is turned on.

Furthermore, via, for example, SM bus 206, BMC 204 can communicate with NIC connector 208. NIC connector 208 can be configured to couple to, seat, or mount, a NIC, such as OCP NIC compliant NIC 220. In some embodiments, NIC connector 208 can be small form factor technology affiliate (SFF-TA)-1002 compliant. In some embodiments, NIC 220 can be OCP NIC 3.0 specification compliant.

NIC 220 can comprise multiple (e.g., gold finger) pins that can be defined by SFF-TA-1009. For example, pins 106 indicated in connection with FIG. 1. A portion of pins 106 can be allocated as RBT pins. As detailed herein, a portion of the RBT pins can be repurposed as flexIO pins and/or can be otherwise reused to propagate precision timing synchronization signals. As noted, precision timing synchronization signals can support high precision clock profiles such as G.8265.1, G.8275.1, and G.8275.2 within a system. A representative example of the RBT pins that can be repurposed can be found with reference to FIG. 3A.

While still referring to FIG. 2, but turning now as well to FIGS. 3A and 3B, block diagrams 300A and 300B are illustrated. Diagram 300A illustrates an example of specific RBT pins being repurposed according to a general flexIO allocation as well as a specific precision timing synchronization allocation in accordance with certain embodiments of this disclosure. Diagram 300B illustrates an example of flexIO selection modes and leveraging an RBT_Isolate# signal in accordance with certain embodiments of this disclosure.

With specific reference to FIG. 3A, column 304 indicates the specific OCP NIC pin (e.g., in this example in accordance with OCP NIC 3.0). Column 306 indicates the specific flexIO pin value to which the associated OCP NIC pin 304 can be assigned. Column 308 indicates the RBT function that was specified for the associated OCP NIC pin 304. Column 310 indicates the precision timing synchronization function or role of the associated OCP NIC pin 304.

In this manner, OCP NIC pins 304 can be transformed to flexIO pins in order to support RBT function, precision timing synchronization function, or both. In some cases other functionality can be supported by flexIO assignment. By convention "TX" represents transmitting from motherboard 202 to NIC 220 and "RX" represents receiving by the motherboard 202 from NIC 220. In the context of precision timing synchronization function 310, frequency can be either single-ended or differential, which can be defined by record 223 as further detailed below. "P" can be used for single-ended clocks and "_N" pins can be set to ground on motherboard 202.

"TS_GPIO" (e.g., general purpose input/output) functionality and direction can also be indicated in record 223. TS_GPIO pins can be used to indicate physical loss-of-signal, squelch, alarm indicators, and so forth. It is understood that OCP NIC pins 304, including OCP_A7 pin, OCP_A8 pin, OCP_A9 pin, OCP_A14 pin, OCP_B8 pin, OCP_B9 pin, and OCP_B14 pin are intended to be representative may include other additional or alternative OCP NIC pins. Moreover, the actual set of OCP pins 304 are in this example assigned to specific flexIO pins 306 and timing synchronization pins 310, namely flexIO pins 0-6, and timing synchronization pins TS_GPI, TSTX_FREQ_N, TSTX_FREQ_P, TSTX_SYNC, TSRX_FREQ_N, TSRX_FREQ_P, and TSRX_SYNC. However, it is understood that both flexIO pins 306 and timing synchronization pins 310 can be assigned to different members of the set of OCP NIC pins 304 than is illustrated in this example.

Still referring to FIGS. 2 and 3B, in order to establish the capabilities of an associated NIC 220, device 200 and/or motherboard 202 can leverage SM bus 206 that is routed to NIC 220. In that regard, motherboard 202 can query field replaceable unit (FRU) electrically erasable programmable read only memory (EEPROM) 222. For instance, the disclosed techniques can provide for a new or expanded record 223 that can be stored in FRU EEPROM 222, and that can, inter alia, specify operating modes and/or capabilities of NIC 220.

To select a given mode, the disclosed techniques can transform the single RBT_Isolate# signal 250 found on motherboard 202 into a two-pin FlexI/O selection bus represented as FlexIO_sel[1:0]. Such can be leveraged to drive a matrix of field effect transistor (FET) switches, buffers, or equivalent to create a flexible signal bus structure. As a representative example, see FET switch matrix 210. FET switch matrix 210 can communicate with BMC 204 via flexIO channel 212 or RBT channel 214. FET switch matrix 210 can communicate with board timing circuit 216 via timing clock channel 218.

Depending on how NIC 220 is provisioned in terms of supporting RBT and precision timing synchronization, FET switch matrix 210 can replicate the associated format onto NIC 220, which is illustrated as (optional) FET switch matrix 224. FlexIO data, network controller sideband interface (NCSI) data, and/or timing data can be provided from NIC connector 208 to FET switch matrix 224 (if present) via channel 226 or otherwise to application-specific integrated circuit (ASIC) 228. Communication channels there between can include RBT data 230 as well as timing data 232.

The FlexIO_sel[1:0] (e.g., flexIO channel 212) can operate the same or similar as the RBT_Isolate# signal 250 during different power states as described in OCP NIC 3.0 v1.3 section 3.4.4 and table 26 where the bus is isolated until the AUX_PWR_EN and NIC_PWR_GOOD are asserted. Doing so can ensure backward compatibility to OCP NICs that do not support FlexI/O.

FIG. 3B illustrates column 320 that indicates the flexIO_sel[1:0] values. Column 322 indicates a mode description that is associated with a given flexIO_sel[1:0] value of column 320. As noted, FlexIO_sel can operate the same as RBT_Isolate #during different power states described in the OCP NIC 3.0 v1.3 section 3.4.4 and table 26. Furthermore, for systems with OCP NIC 3.0 v1.3 or earlier, FlexIO_sel[0] can serve as an RBT_Isolate# signal for backward compatibility.

In terms of feature support, motherboard 202 that is designed to support the additional functions can support both RBT and timing synchronization modes as defined by the FlexI/O selection setting. The NIC 220 can have the option of supporting either RBT, precision timing synchronization, or both. In the presence of OCP NIC 3.0 cards v1.3 or earlier as well as motherboards previously designed without FlexI/O, both the NIC and associated motherboard can relegate to supporting just RBT.

FIGS. 4 and 5 are intended to be examined in connection with FIG. 2. FIG. 4 illustrates an example diagram 400 of a first portion of a specification for data associated with the record 223 in accordance with certain embodiments of this disclosure. FIG. 5 illustrates an example diagram 500 of a second portion of a specification for data associated with the record 223 in accordance with certain embodiments of this disclosure. Block diagrams 400 and 500 comprise an example offset 402 (e.g., a byte offset), an example length 404 (e.g., a number of bytes), and an associated description 406.

It is understood that record 223 can comprise multiple potential operating modes, examples of which are detailed herein. For example, with specific reference to FIG. 4, record 223 can comprise ingress frequency mode 408, which in this example is signified by offset 402 being "0". Ingress frequency mode 408 can relate to how TSRX_FREQ_P or TSRX_FREQ_N signals operate. Such signals can operate according to either single-ended clock timing or differential clock timing. Various examples are given for 0x00-0xFF, but it is appreciated that these specifications are merely examples and not intended to be limiting.

As another example, record 223 can describe ingress sync pulse mode 410, which in this example is signified by offset 402 being "1". Ingress synch pulse mode 410 can indicate how the TSRX_SYNC signal can operate. For example, as indicated at 0x00 a sync pulse can be asserted once every second.

As still another example, record 223 can describe egress frequency mode 412, which in this example is signified by offset 402 being "2". Egress frequency mode 412 can indicate how the TSTX_FREQ_P or TSTX_FREQ_N signals can operate. Such signals can operate according to either single-ended clock timing or differential clock timing. Various examples are given for 0x00-0xFF, but it is appreciated that these specifications are merely examples and not intended to be limiting.

Regarding FIG. 5, record 223 can describe egress sync pulse mode 502, which in this example is signified by offset 402 being "3". Egress synch pulse mode 502 can indicate how the TSTX_SYNC signal can operate. For example, as indicated at 0x00 a sync pulse can be asserted once every second.

As another example, record 223 can describe timing synchronization GPIO mode 504, which in this example is signified by offset 402 being "4". Timing synchronization GPIO mode 504 can indicate how TS_GPIO is to be configured in compliance with motherboard 202. For example, the GPIO can operate as an output (e.g., transmitted from NIC 220 to motherboard 202), as an input (e.g., transmitted from motherboard 202 to NIC 220), or set to be an unused signal. In some embodiments, by default, the GPIO on NIC 220 can be set to unused, which can require or cause the system to configure the GPIO if the signal is used.

It is to be appreciated that by providing precision timing synchronization, via NIC connector 208, between motherboard 202 and OCP NIC 220, use of coaxial cables and associated connectors (e.g., connectors 102, 104, . . . ) can be reduced or eliminated entirely, resulting in a more desirable OCP NIC 220. OCP NICs that do not rely on the use of external or internal coaxial cables can reduce the cost of implementation and maintenance while potentially increasing reliability of the precision time synchronization between motherboard 202 and NIC 220.

As detailed, such can be accomplished by transforming RBT connector pins into flexIO pins, as the RBT connector pins are both optional and becoming disfavored and/or unused due to the introduction of USB management bus, which is about five times faster than RBT. Transforming the RBT pins to flexIO pins can extend the life of the OCP NIC 3.0 specification and can allow precision timing synchronization functionality as well as other use cases not currently specified via a standardized flexIO implementation.

Figure 6:
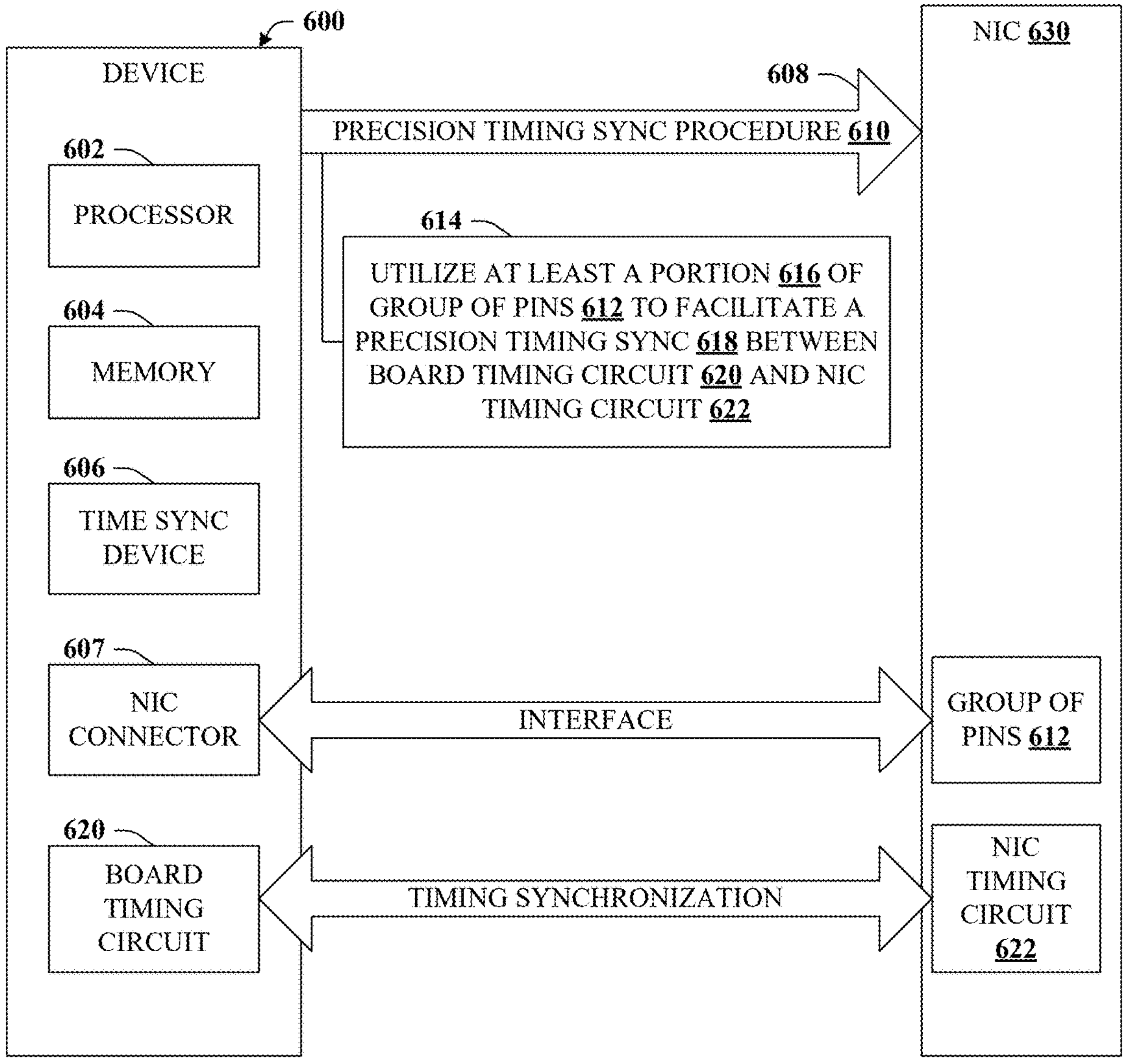
FIG. 6 depicts a schematic block diagram is depicted illustrating an example system that can facilitate precision timing synchronization across a NIC connector by repurposing RBT pins in accordance with certain embodiments of this disclosure.

With reference now to FIG. 6, a schematic block diagram is depicted illustrating an example system 600 that can facilitate precision timing synchronization across a NIC connector by repurposing RBT pins in accordance with certain embodiments of this disclosure. In some embodiments, device 600 can be a server device such as server device 200, as detailed in connection with FIG. 2

Device 600 can comprise at least one processor 602 that, potentially along with time sync device 606, can be specifically configured to perform functions associated with precision timing synchronization. Device 600 can also comprise at least one memory 604 that stores executable instructions that, when executed by the at least one processor 602, can facilitate performance of operations. Processor(s) 602 can be a hardware processor having structural elements known to exist in connection with processing units or circuits, with various operations of processor 602 being represented by functional elements shown in the drawings herein that can require special-purpose instructions, for example, stored in memory 604 and/or time sync device 606. Along with these special-purpose instructions, processor 602 and/or time sync device 606 can be a special-purpose device. Further examples of the memory 604 and processor 602 can be found with reference to FIG. 11. It is to be appreciated that device 600 or computer 1102 can represent a server device or a client device of a network, data center, or telecommunications platform and computer 1102 can be used in connection with implementing one or more of the systems, devices, or components shown and described in connection with FIG. 6 and other figures disclosed herein.

Device 600 can comprise a NIC connector 607, which can be substantially similar to NIC connector 208 detailed in connection with FIG. 2. For example, NIC connector 607 can be configured to interface with an OCP NIC such as NIC 630, which can be substantially similar to NIC 220 and can be compliant with OCP NIC 3.0 specifications. As indicated, device 600 can further comprise board timing circuit 620, which can be substantially similar to board timing circuit 206 detailed in connection with FIG. 2.

As previously detailed in connection with NIC 220, NIC 630 can comprise a group of pins 612 that can interface with NIC connector 607. Group of pins 620 can be a portion of pins 106 described in connection with FIG. 1, namely the portion of pins 106 that are allocated to RBT functions. Additionally, NIC 630 can comprise NIC timing circuit 622 which can be substantially similar to NIC timing circuit As illustrated at reference numeral 608, device 600 can perform precision timing synchronization procedure 610. Precision timing synchronization procedure 610 can, as indicated at reference numeral 614, utilize at least a portion 616 of group of pins 612 (e.g., pins allocated to RBT functions) to facilitate a precision timing synchronization 618 between board timing circuit 620 can NIC timing circuit 622.

Figure 7:
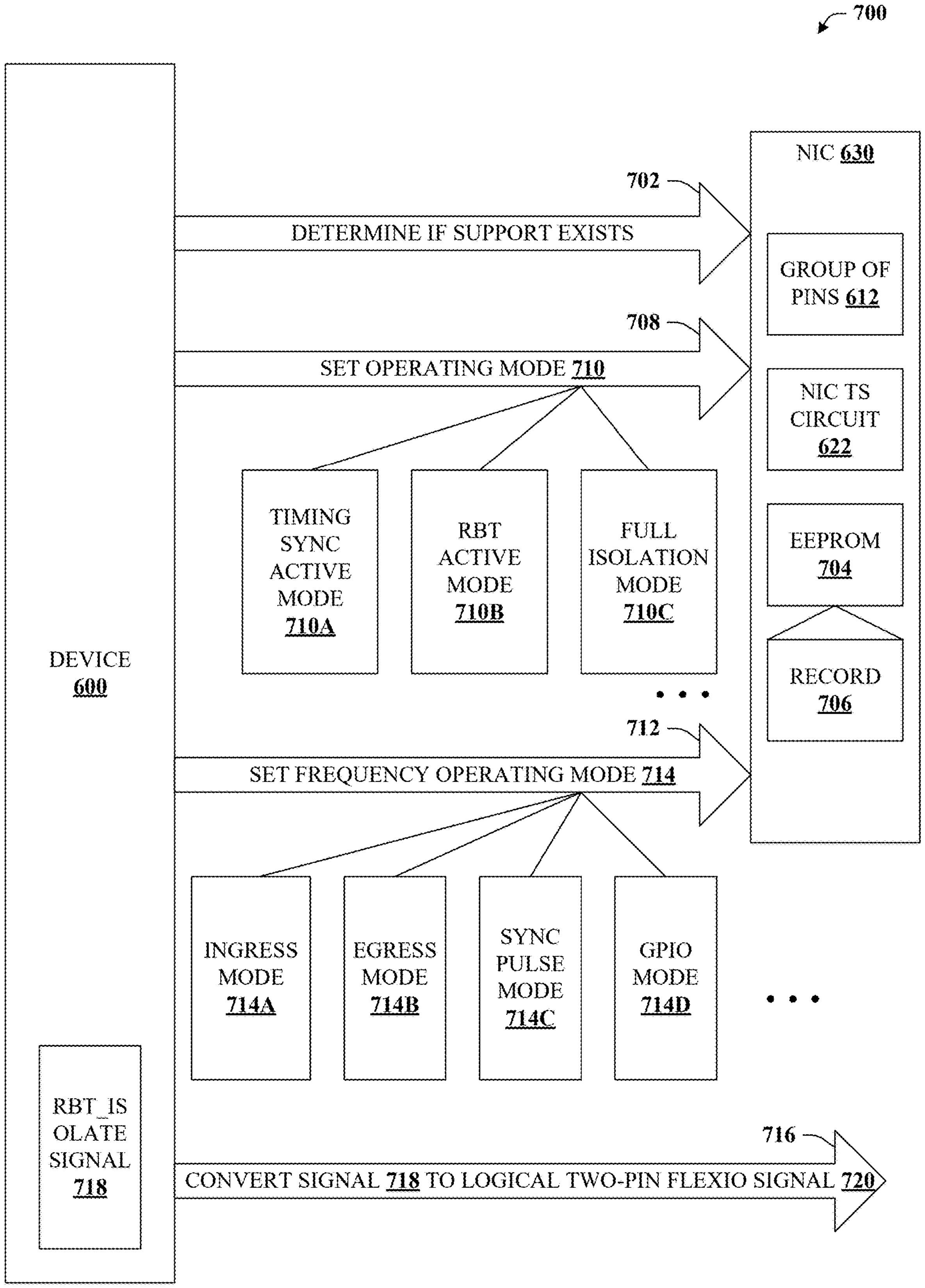
FIG. 7 depicts a schematic block diagram illustrating additional aspects or elements of the system that can facilitate precision timing synchronization across a NIC connector by repurposing RBT pins in accordance with certain embodiments of this disclosure.

Turning now to FIG. 7, a schematic block diagram 700 is depicted illustrating additional aspects or elements of the system 600 that can facilitate precision timing synchronization across a NIC connector by repurposing RBT pins in accordance with certain embodiments of this disclosure.

For example, at reference numeral 702, device 600 can determine whether or not NIC 630 supports repurposing the portion 616 of the group of pins 612 that are configured for RBT for use with precision timing synchronization procedure 610. Such can be accomplished in response to communication with EEPROM 704 of NIC 630. EEPROM 704 can be substantially similar to FRU EEPROM 222 detailed in connection with FIG. 2. For instance, if record 706 and/or record 223 does not exist, then it can be determined that NIC 630 does not support precision timing synchronization procedure 610 and/or flexIO functionality. Otherwise, record 706 can be examined to determine the configuration of NIC 630 in the context of precision timing synchronization procedure 610 or another suitable flexIO function.

At reference numeral 708, device 600 can set an operating mode 710 of NIC 630. For example, operating mode 710 can be set to timing sync active mode 710A in which the precision timing synchronization functions are asserted. Such can correspond to flexIO_sel[1:0] being set to "10" was indicated in diagram 300B. As another example, operating mode 710 can be set to RBT active mode 710B in which RBT functions are asserted. Such can correspond to flexIO_sel[1:0] being set to "01" was indicated in diagram 300B. As yet another example, operating mode 710 can be set to full isolation mode 710C in which both the precision timing synchronization functions and the RBT functions are asserted. Such can correspond to flexIO_sel[1:0] being set to "00" was indicated in diagram 300B.

At reference numeral 712, device 600 can set a frequency operating mode 714 for NIC 630. Various examples can be found in connection with FIGS. 4 and 5. For instance, ingress mode 714A can relate to how TSRX_FREQ_P or TSRX_FREQ_N signals operate (e.g., single-ended, differential, . . . ) as detailed in connection with ingress frequency mode 408. Egress mode 714B can relate to how TSTX_FREQ_P or TSTX_FREQ_N signals operate (e.g., single-ended, differential, . . . ) as detailed in connection with egress frequency mode 412

As other examples, frequency operating mode 714 can relate to sync pulse mode 714C. Sync pulse mode 714C can indicate how the TSRX_SYNC and TSTX_SYNC signals operate. For example, one pulse per second or the like as detailed in connection with ingress sync pulse mode 410 and egress sync pulse mode 502. GPIO mode 714D can indicate how TS_GPIO is to be configured in compliance with device 600, as detailed in connection with timing synchronization GPIO mode 504.

In some embodiments, as indicated at reference numeral 716, device 600 can convert RBT_Isolate# signal 718 to a logical two-pin flexIO signal 720. Such can be leveraged to drive a matrix of field effect transistor switches, buffers, or equivalent to create a flexible signal bus structure, as detailed in connection with diagram 300B.

Example Methods

Figure 8:
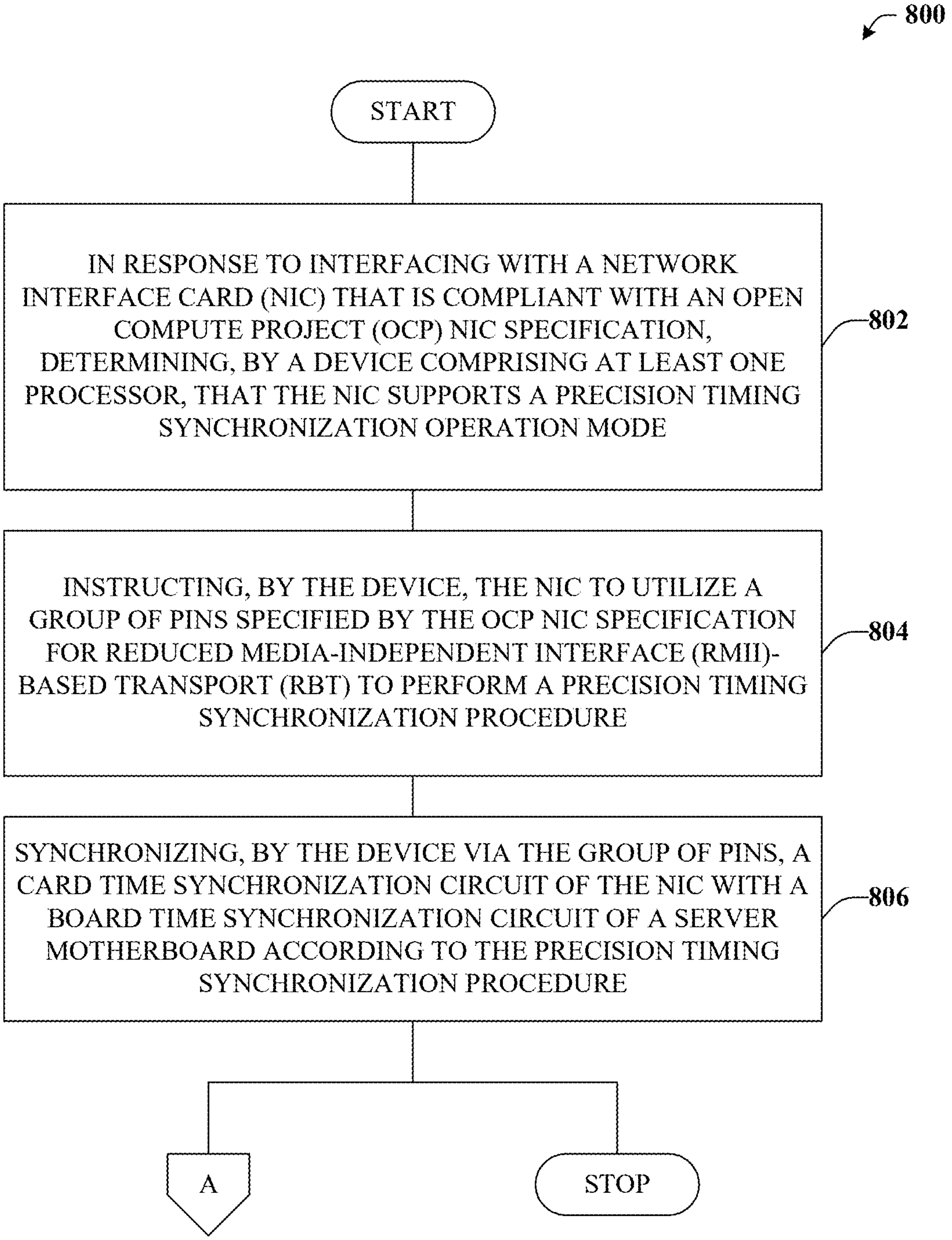
FIG. 8 illustrates an example method that can facilitate precision timing synchronization across a NIC connector by repurposing RBT pins in accordance with certain embodiments of this disclosure.
Figure 9:
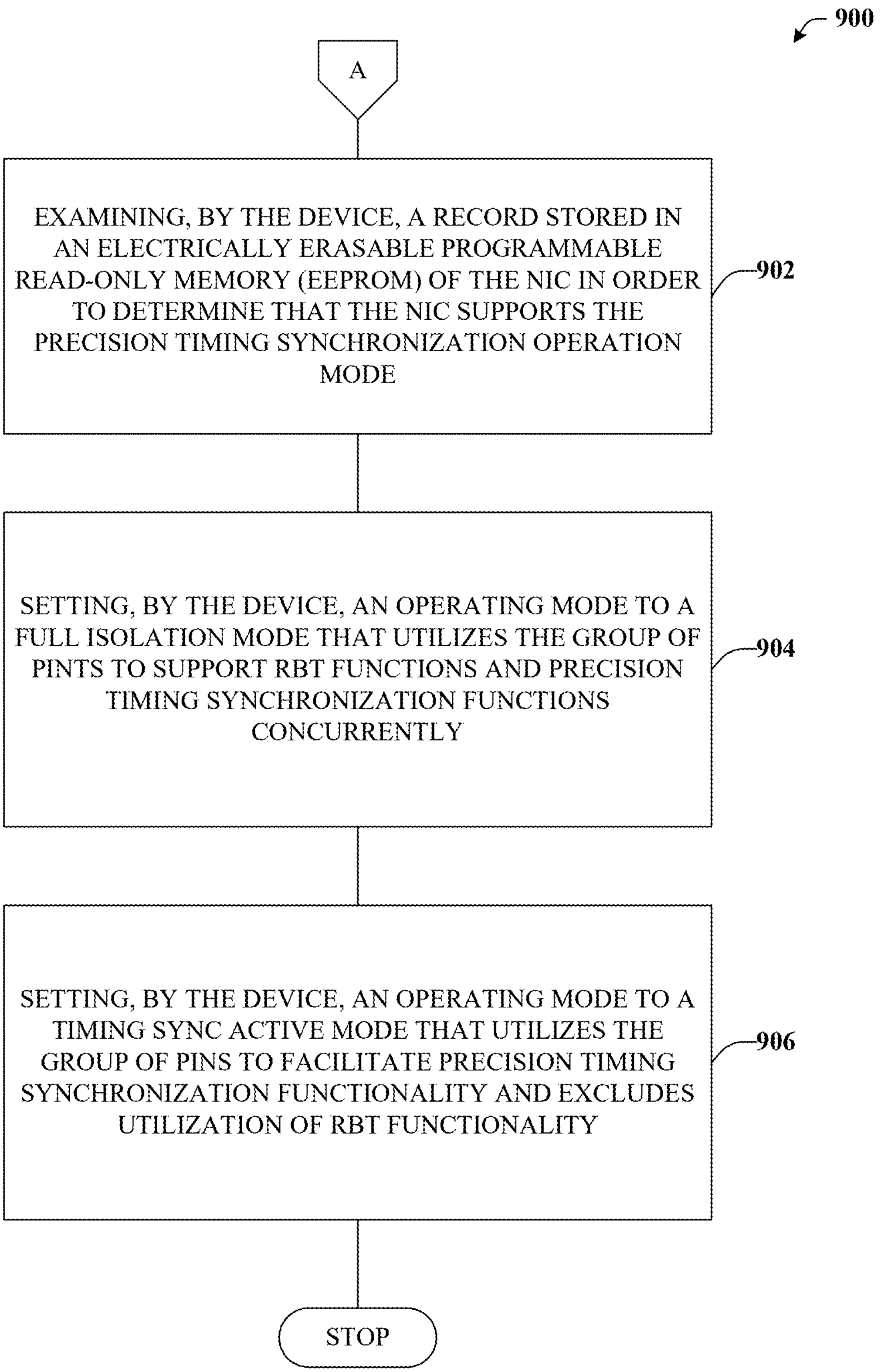
FIG. 9 illustrates an example method that can provide for additional elements or functionality relating to facilitating precision timing synchronization across a NIC connector by repurposing RBT pins in accordance with certain embodiments of this disclosure.

FIGS. 8 and 9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Turning now to FIG. 8, exemplary method 800 is depicted. Method 800 can facilitate precision timing synchronization across a NIC connector by repurposing RBT pins in accordance with certain embodiments of this disclosure. While method 800 describes a complete method, in some embodiments, method 800 can include one or more elements of method 900, reached via insert A, as discussed at FIG. 9.

At reference numeral 802, a device comprising at least one processor can determine that a network interface card (NIC) supports a precision timing synchronization operation mode. The determination that the NIC supports the precision timing synchronization operation mode can be made in response to interfacing the device to the NIC that is compliant with an open compute project (OCP) NIC specification. For example, the NIC can be compliant with an OCP NIC 3.0 specification.

At reference numeral 804, the device can instruct the NIC to utilize a group of pins specified by the OCP NIC specification for reduced media-independent interface (RMII)-based transport (RBT) to perform a precision timing synchronization procedure. In other word, pins that are specified for RBT functions can be repurposed to precision timing synchronization functions.

At reference numeral 806 the device can synchronize a card time synchronization circuit of the NIC with a board time synchronization circuit of a server motherboard according to the precision timing synchronization procedure. Because NIC pins are being used to effectuate the precision timing synchronization procedure, other cabling such as coaxial cabling that is traditionally used for precision timing synchronization can be unnecessary. Method 800 can terminate in some embodiments, or proceed to insert A in other embodiments, which is further detailed in connection with FIG. 9.

Turning now to FIG. 9, exemplary method 900 is depicted. Method 900 can provide for additional elements or functionality relating to facilitating precision timing synchronization across a NIC connector by repurposing RBT pins in accordance with certain embodiments of this disclosure.

For example, at reference numeral 902, the device introduced in connection with FIG. 8 can examine a record stored in an electrically erasable programmable read-only memory (EEPROM) of the NIC in order to determine that the NIC supports the precision timing synchronization operation mode. In some embodiments, if the record does not exist, this it can be determined that the NIC does not support the precision timing synchronization operation mode.

A reference numeral 904, the device can set an operating mode to a full isolation mode that utilizes the group of pins to support RBT functions and precision timing synchronization functions concurrently. In some embodiments, other operation modes can be set such as an RBT-only mode (e.g., in cases where the NIC does not support the precision timing synchronization mode), a precision timing synchronization-only mode, and so on.

A reference numeral 906, the device can set an operating mode to a timing sync active mode that utilizes the group of pins to facilitate precision timing synchronization functionality and excludes utilization of RBT functionality. Hence, in this scenario, the NIC can be set to a precision timing synchronization-only mode, which can be implemented on any suitable NIC that provides adequate support for such, which, e.g., can be indicated by an EEPROM record.

Example Operating Environments

Figure 10:
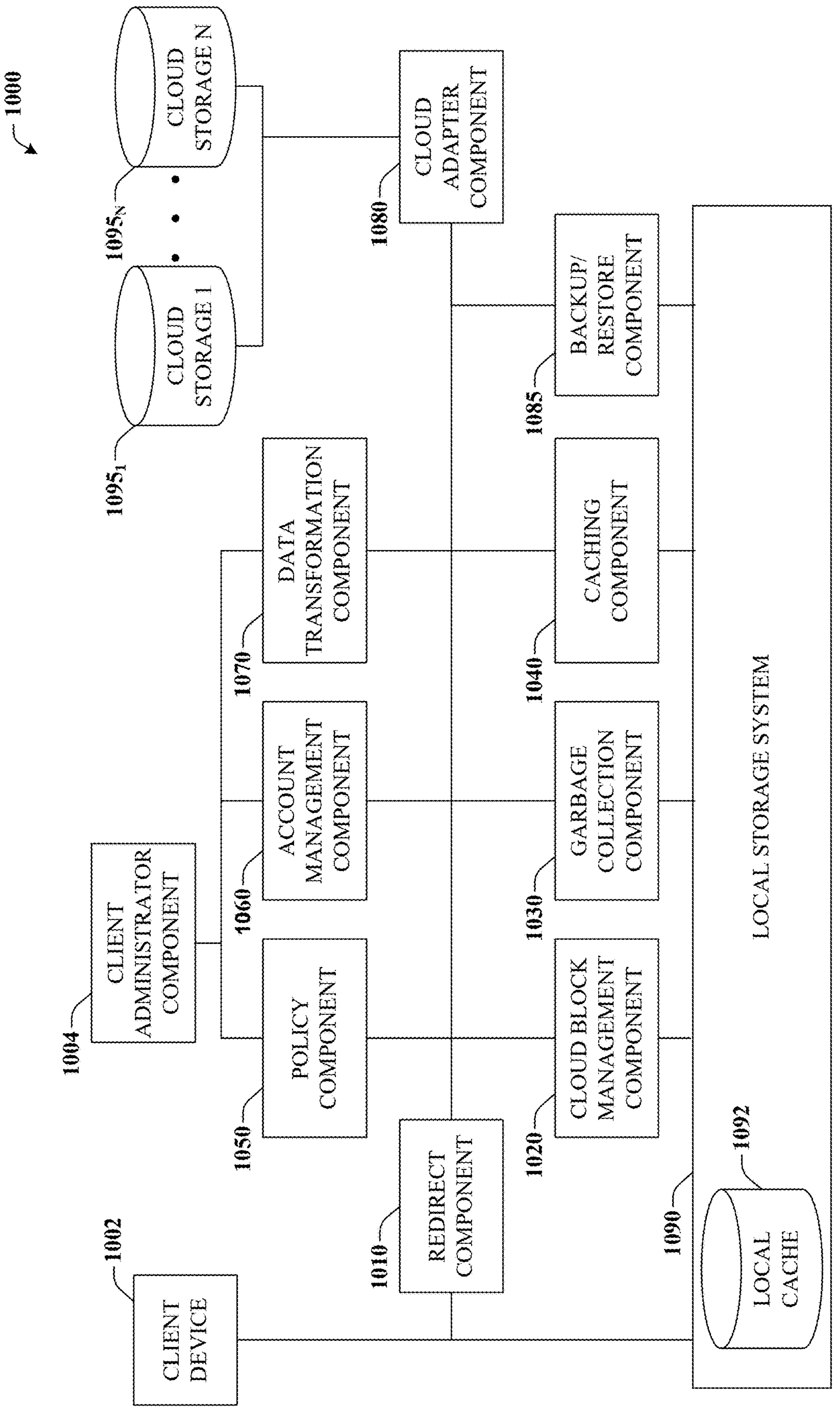
FIG. 10 illustrates a block diagram of an example distributed file storage system that employs tiered cloud storage in accordance with certain embodiments of this disclosure.
Figure 11:
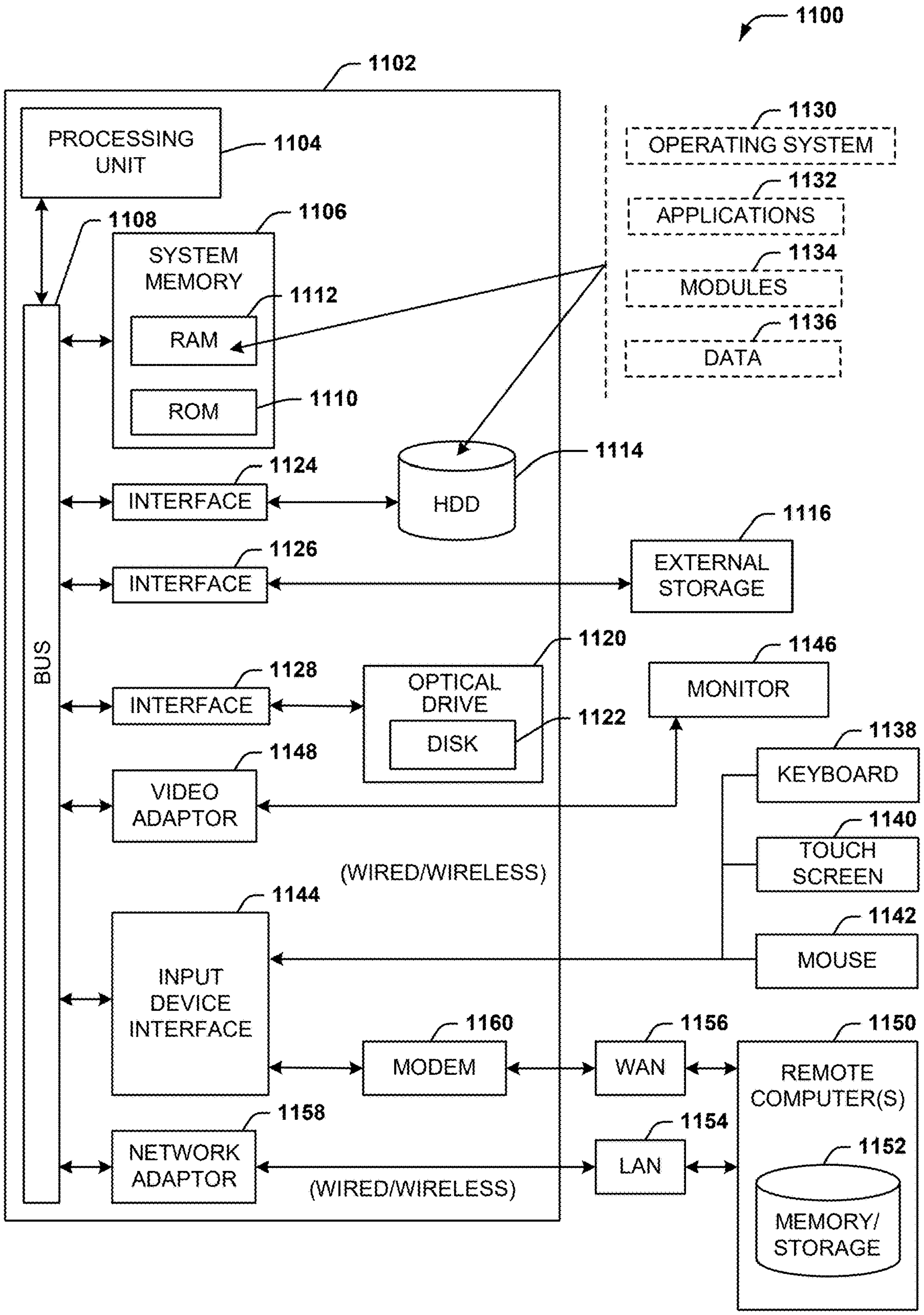
FIG. 11 illustrates an example block diagram of a computer operable to execute certain embodiments of this disclosure.

To provide further context for various example embodiments of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with example embodiments described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 $\mathbf{1095}_1$ and cloud storage N $\mathbf{1095}_N$, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that are tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on a list of mappings that the cloud block management component 1020 manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that the file has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time the stub file is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can request or require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various example embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an example embodiment, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more example embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term “or” is intended to mean an inclusive “or” rather than an exclusive “or.” That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the articles “a” and “an” as used in this application and the appended claims should generally be construed to mean “one or more” unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term “includes” is used in either the detailed description or the claims, such term is intended to be inclusive in a manner similar to the term “comprising” as “comprising” is interpreted when employed as a transitional word in a claim.

What is claimed is:

1. A device, comprising:

a board time synchronization circuit;

a network interface card connector coupled to a network interface card (NIC), wherein the NIC is compliant with an open compute project (OCP) NIC specification and comprises:

a group of pins that are configured for reduced media-independent interface (RMII)-based transport (RBT); and an NIC timing synchronization circuit; and at least one non-transitory memory that stores executable instructions that, when executed by at least one processor, facilitate performance of:

at least a precision timing synchronization procedure that utilizes at least a portion of the group of pins to facilitate a precision timing synchronization between the board time synchronization circuit and the NIC timing synchronization circuit, in response to communication of a record stored in a field replaceable unit (FRU) electrically erasable programmable read-only memory (EEPROM), a determination that the NIC supports repurposing the group of pins that are configured for RBT for use with the precision timing synchronization procedure, and setting of an operating mode to a full isolation mode that concurrently supports RBT functions and the precision timing synchronization, or in response to the communicating with the FRU EEPROM, a determination of a frequency operating mode comprising at least one of an egress synchronization mode or an ingress synchronization mode.

2. The device of claim 1, wherein the NIC connector is small form factor technology affiliate (SFF-TA)-1002 compliant.

3. The device of claim 1, wherein the NIC is compliant with an OCP NIC 3.0 specification.

4. The device of claim 1, wherein the portion of the group of pins used to facilitate the precision timing synchronization comprises at least one of: an OCP_A7 pin, an OCP_A8 pin, an OCP_A9 pin, an OCP_A14 pin, an OCP_B8 pin, an OCP_B9 pin, or an OCP_B14 pin.

5. The device of claim 1, wherein the portion of the group of pins used to facilitate the precision timing synchronization are repurposed to at least one of multiple flexIO pins, comprising: a TS_GPIO pin, a TSTX_FREQ_N pin, a TSTX_FREQ_P pin, a TSTX_SYNC pin, a TSRX_FREQ_N pin, a TSRX_FREQ_P pin, or a TSRX_SYNC pin.

6. The device of claim 1, wherein the executable instructions, when executed by the at least one processor, further facilitate performance of a setting of an operating mode to a timing sync active mode that supports the precision timing synchronization.

7. The device of claim 1, wherein the determination that the NIC supports the repurposing comprises a conversion of an RBT_Isolate# signal into a logical two-pin flexIO signal that supports additional operating modes beyond RBT functionality based on the repurposing of the group of pins.

8. A device, comprising:

a network interface card (NIC) that is compliant with an open compute project (OCP) NIC specification, wherein the NIC comprises:

a group of pins that are configured for reduced media-independent interface (RMII)-based transport (RBT);

an NIC timing synchronization circuit; and an electrically erasable programmable read-only memory (EEPROM) comprising a record that specifies functionality of the group of pins according to a precision timing synchronization mode, wherein the record specifies a full isolation mode that leverages the group of pins to facilitate RBT functionality and precision timing synchronization functionality concurrently, or wherein the record specifies a timing sync active mode that leverages the group of pins to facilitate precision timing synchronization functionality without RBT functionality.

9. The device of claim 8, wherein the NIC is compliant with an OCP NIC 3.0 specification.

10. The device of claim 8, wherein a portion of the group of pins used to facilitate the precision timing synchronization mode comprises at least one of: an OCP_A7 pin, an OCP_A8 pin, an OCP_A9 pin, an OCP_A14 pin, an OCP_B8 pin, an OCP_B9 pin, or an OCP_B14 pin.

11. The device of claim 8, wherein a portion of the group of pins used to facilitate the precision timing synchronization mode are repurposed to at least one of multiple flexIO pins, comprising: a TS_GPIO pin, a TSTX_FREQ_N pin, a TSTX_FREQ_P pin, a TSTX_SYNC pin, a TSRX_FREQ_N pin, a TSRX_FREQ_P pin, or a TSRX_SYNC pin.

12. A method, comprising:

in response to interfacing with a network interface card (NIC) that is compliant with an open compute project (OCP) NIC specification, determining, by a device comprising at least one processor, that the NIC supports a precision timing synchronization operation mode;

instructing, by the device, the NIC to utilize a group of pins specified by the OCP NIC specification for reduced media-independent interface (RMII)-based transport (RBT) to perform a precision timing synchronization procedure;

synchronizing, by the device via the group of pins, a card time synchronization circuit of the NIC with a board time synchronization circuit of a server motherboard according to the precision timing synchronization procedure; and setting, by the device, an operating mode to a full isolation mode that utilizes the group of pins to support RBT functions and precision timing synchronization functions concurrently; or setting, by the device, an operating mode to a timing sync active mode that utilizes the group of pins to facilitate precision timing synchronization functionality and excludes utilization of RBT functionality.

13. The method of claim 12, further comprising, examining, by the device, a record stored in an electrically erasable programmable read-only memory (EEPROM) of the NIC in order to determine that the NIC supports the precision timing synchronization operation mode.

14. The device of claim 8, wherein the NIC connector is small form factor technology affiliate (SFF-TA)-1002 compliant.

15. The method of claim 12, wherein the NIC connector is small form factor technology affiliate (SFF-TA)-1002 compliant.

16. The method of claim 12, wherein the NIC is compliant with an OCP NIC 3.0 specification.

17. The method of claim 12, wherein a portion of the group of pins used to facilitate the precision timing synchronization comprises at least one of: an OCP_A7 pin, an OCP_A8 pin, an OCP_A9 pin, or an OCP_A14 pin.

18. The method of claim 12, wherein a portion of the group of pins used to facilitate the precision timing synchronization comprises at least one of: an OCP_B8 pin, an OCP_B9 pin, or an OCP_B14 pin.

19. The method of claim 12, wherein a portion of the group of pins used to facilitate the precision timing synchronization are repurposed to at least one of multiple flexIO pins, comprising: a TS_GPIO pin, a TSTX_FREQ_N pin, a TSTX_FREQ_P pin, or a TSTX_SYNC pin.

20. The method of claim 12, wherein a portion of the group of pins used to facilitate the precision timing synchronization are repurposed to at least one of multiple flexIO pins, comprising: a TSRX_FREQ_N pin, a TSRX_FREQ_P pin, or a TSRX_SYNC pin.

* * * * *